(12) United States Patent
Rensmo

(10) Patent No.: US 9,123,267 B2
(45) Date of Patent: Sep. 1, 2015

(54) LIGHT PANEL AND METHOD FOR PRODUCING THE LIGHT PANEL

(76) Inventor: Anders Rensmo, Orebro (SE)

( * ) Notice: Subject to any disclaimer, the term of this patent is extended or adjusted under 35 U.S.C. 154(b) by 231 days.

(21) Appl. No.: 13/812,565

(22) PCT Filed: Jun. 30, 2011

(86) PCT No.: PCT/SE2011/050883
§ 371 (c)(1),
(2), (4) Date: Jan. 28, 2013

(87) PCT Pub. No.: WO2012/015352
PCT Pub. Date: Feb. 2, 2012

(65) Prior Publication Data
US 2013/0120969 A1    May 16, 2013

(30) Foreign Application Priority Data

Jul. 28, 2010 (SE) .................................... 1050834

(51) Int. Cl.
*F21V 7/04* (2006.01)
*G09F 13/04* (2006.01)
(52) U.S. Cl.
CPC ....... *G09F 13/0409* (2013.01); *Y10T 156/1056* (2015.01)

(58) Field of Classification Search
USPC ................................. 362/97.1, 608, 615, 627
See application file for complete search history.

(56) References Cited

U.S. PATENT DOCUMENTS

| 6,667,089 B1 | 12/2003 | Barker |
| 2008/0078111 A1 | 4/2008 | Kaoh et al. |
| 2009/0231834 A1 | 9/2009 | Krohn |

FOREIGN PATENT DOCUMENTS

GB    2421109    6/2006

OTHER PUBLICATIONS

International Search Report dated Nov. 14, 2011, corresponding to PCT/SE2011/050883.

*Primary Examiner* — Meghan Dunwiddie
(74) *Attorney, Agent, or Firm* — Young & Thompson

(57) ABSTRACT

A light panel includes a light panel front (2) made of a translucent, self-supporting structure having a forward panel (10) distanced from a rear panel (12) via cross-linking walls (11) and arranged in the light panel to transmit light from one or more light sources (3) arranged behind the light panel front. A light scattering medium is arranged between the light source (3) and the forward panel (10) of the light panel front.

19 Claims, 2 Drawing Sheets

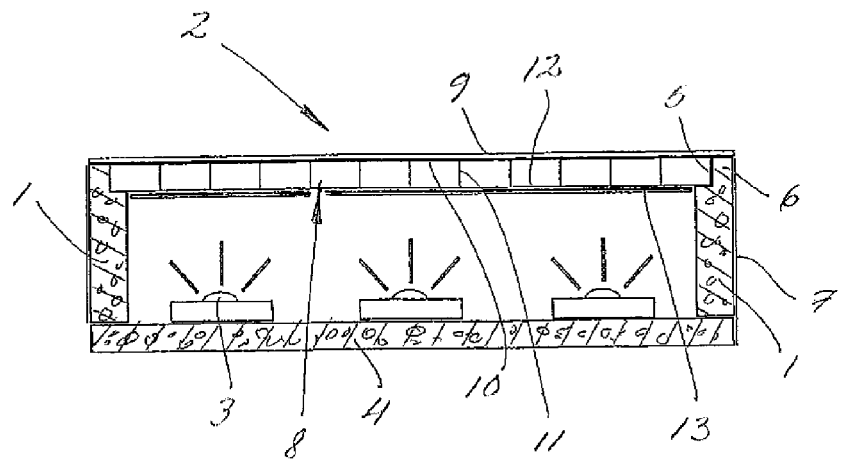
Fig. 1
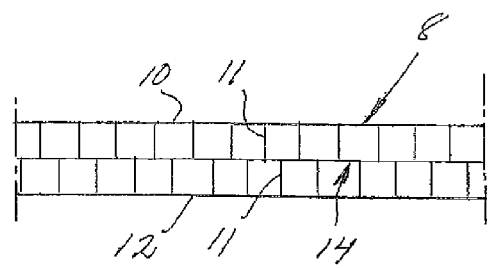
Fig. 2.a
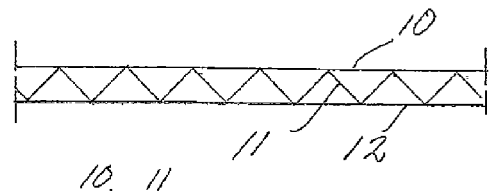
Fig. 2.b
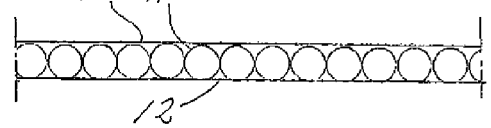
Fig. 2.c
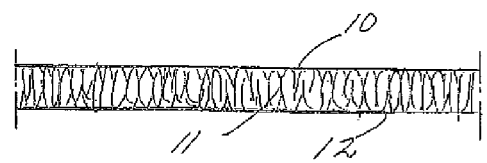
Fig. 2.d
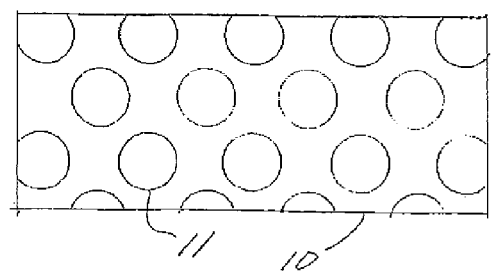
Fig. 2.e

LIGHT PANEL AND METHOD FOR PRODUCING THE LIGHT PANEL

TECHNICAL FIELD OF THE INVENTION

The invention refers to a light panel, and more precisely to a light panel of low weight which results in reduced stresses being applied to mounting means and to a surface onto which the light panel is to be mounted. The invention additionally refers to a method for producing the light panel of low weight.

BACKGROUND AND PRIOR ART

The invention reefers to electrically illuminated light panels. Light panels configured for light transmission, such as for illumination of a symbol that is carried on a front face of the light panel, are usually designed as a lighting box that houses one or more light sources and which carries, on a front face of the box, a translucent front panel on which is supported a colored and translucent or light-proof symbol, typically in the form of a colored plastic film. The structural stability of this light panel is provided by the box which is usually manufactured from sheets of metal, whereas the front panel itself lacks inherent stability and torsional rigidity.

Light sources used in light panels are fluorescent lamps, bulbs, light emitting diodes or diode lamps, e.g., to which energy is supplied typically via a connection to the supply mains and which are controlled between switching on and off by means of a timer or a light sensor, e.g.

The front panel is typically made of a translucent and non-transparent acrylic plastic. Acrylic plastic is a homogenous and flexible material that has no directional stability of its own, and which requires support from a rigid supporting frame in order to provide a planar base for a symbol that is to be supported on the front panel. Translucent light panels in sizes which are suitable to be looked at from a greater distance comprise acrylic plastic front panels of considerable weight and thickness, requiring a box of corresponding design and weight in order to support and to stabilize the front panel. This in turn results in raised demands on mounting means and on the surface onto which the light panel is to be mounted. The weight of the conventionally designed light panel is therefore a problem by its own when light panels are mounted on interior walls or brittle building faces, such as plastered house facades, for instance.

The publication of US 2009/0231834 discloses an alternative to the heavy acrylic plastic panel. The document describes a light panel wherein light sources are seated internally in the channels of a channeled plastic sheet. Briefly explained, the channel plastic sheet is a self-supporting structure made of clear plastic having a forward panel that is spaced from a rear panel by means of interconnecting transverse walls that are evenly spaced in a rectangular framework. A disadvantage with this solution is that the intensity of emitted light varies over the area of the light panel, with regions of more intense light where the light sources are located. In order to reduce this problem it is suggested in the document to perform some form of light reducing measures on the front face of the light panel. It will be realized that in order to achieve uniform light distribution over the whole area of the light panel by means of measures provided on the front face of the light panel, such measures need to be adapted so as to produce a stronger light reducing effect in front of the light sources as compared to the regions outside the light sources, thus requiring an intricate tuning of the light reducing measures.

Tests performed by the inventor to the present invention have shown that it will not be sufficient to move the light sources to a position behind the channel plastic sheet in attempt to achieve a uniform light intensity over the whole area of the prior art light panel. This measure will render the light panel look striped, presumably caused by light captured inside the transverse walls which like optic fibers concentrate the light to the forward panel of the channeled plastic sheet.

SUMMARY OF THE INVENTION

From a general point of view the invention aims at providing a light panel of low weight which results in a substantially reduced load being applied to mounting means and to the surface onto which the light panel is to be mounted.

One object of the invention is to provide a light panel that achieves great flexibility and freedom of design as well as freedom of presentation of a symbol or message that is supported on the front face of the light panel.

A specific object of the invention is to provide a light panel comprising a light panel front configured as a self-supporting translucent structure having a forward panel which by means of transverse walls is spaced from a rear panel and by which light of uniform light intensity is emitted from the entire area of the forward panel.

Among other aims and objects of the invention, one is to provide a light panel that can be produced by manual or mechanical methods in a simplified manner; a light panel that is adapted for automized manufacture, and a light panel that is adapted for mounting on a carrier through alternative mounting methods such as by adhesive bonding, by bolting, or by snapping onto a carrier configured for this purpose.

One or more of these objects are met in a light panel configured as specified through the technical features of the claims. Advantageous embodiments of the light panel are specified in subordinated claims.

The present invention thus discloses, briefly, a light panel comprising a light panel front configured as a self-supporting translucent structure having a forward panel which by means of cross-linking walls is distanced from a rear panel and which is arranged in the light panel to transmit light from one or more light sources arranged behind the light panel front, wherein a light scattering medium is arranged between the light source and the forward panel of the light panel front.

The self-supporting structure of the light panel front is provided from its composition of cross-linking walls which are distributed over the area of the light panel front, and which interconnect the forward and rear panels. The cross-linking walls may be arranged at varying intermediate distances, or may be regularly and uniformly distributed so as to define uniformly shaped cavities between the forward and rear panels. The cavities, or channels, may extend to run in parallel with the panels, or be arranged to extend transversely to the light panel front between the forward and rear panels. Channels can be of any random cross-sectional shape, such as polygonal or circular. The cross-linking walls may also alternatively be of non-uniform shape in a random structure defining cavities or cells of random shape between the forward and rear panels of the light panel front. A commercially available sheet element referred to as channel-plastic sheet is an advantageous and preferred alternative for a self-supporting structure to provide a light panel front.

A multi-layered embodiment may comprise one or more intermediate panels running substantially in parallel with the forward and rear panels, the one or more intermediate panels being distanced from the forward and rear panels through cross-linking walls. In a case of more than one intermediate panel, also the intermediate panels may be mutually spaced by means of cross-linking walls.

A multi-layered embodiment may alternatively be provided by joining two or more light panel fronts face to face. The torsional rigidity of a light panel front that is composed this way can be further increased if the channels of one front panel are oriented at crossing directions relative to the channels of the adjacent front panel.

The light panel front may advantageously be produced from colored or uncolored plastics. Polycarbonate plastic (PC) is preferred due to its mechanical properties such as a high impact resistance. Polycarbonate plastic is a transparent thermoplastic which is bendable when at a heated condition, suitable for welding or gluing, and has self-extinguishing qualities if subjected to fire. A plausible alternative to the polycarbonate plastic may be poly-methyl methacrylate (PMMA) plastic which is sold i.a. under the trade name plexiglass.

The light panel front may advantageously be realized in a clear and transparent quality. The light panel front may alternatively be realized in a light-reducing quality that emits a diffuse light when light is transmitted there through.

In one embodiment, especially preferred, a light-scattering measure is performed on the surface of the rear panel of the light panel front. Such measure can include mechanical treatment such as grinding or polishing, or acid treatment/etching, e.g., in order to achieve a matted surface. A light scattering effect may advantageously be achieved by applying, such as by means of an adhesive, a colored or uncolored film onto the rear panel of the light panel front.

A light scattering element may alternatively be arranged separately from the light panel front. An element in the form of a sheet of light scattering film or a foil may in such embodiment be arranged between the light source and the light panel front. In a multi-layered embodiment, a light scattering element may advantageously be inserted between individual layers to effect refraction of incident light and thus transmit a diffuse light to the forward panel of the light panel front.

As used herein, the expression diffuse light refers to light emitted wherein light rays are randomly scattered in various directions. Diffuse light may alternatively and advantageously be achieved by means of a light scattering element produced from a cell material, such as a translucent cellular plastic, or an aerogel, e.g. A commercially available aerogel is sold under the trademark Nanogel®. A cell material may be arranged on the rear panel of the light panel front or arranged separately from the light panel front, or may alternatively be arranged to occupy, or to replace, the cavities and/or the cross-linking walls of the light panel front.

When arranging the translucent light panel front as a self-supporting structure, the need for a stabilizing case to support the light panel front no longer exists. The torsional stability of the light panel front is provided through the spacing of inter-connected forward and rear panels of the light panel front.

However, in a preferred embodiment, the light panel at least comprises a surrounding light panel frame which in a forward edge is connected to the light panel front. A primary object for the light panel frame is to distance the light panel front from a supporting surface onto which the light panel is mounted. The purpose may be to create space for installation of a light source behind the light panel front. The frame need not provide any significant inherent torsional stability, and can be produced from a suitable light-weight material. For the same reason, there is no need for a stable light panel back to complete the light panel, and thus the total weight of the light panel can be kept to a minimum. The latter applies especially in combination with an external light source, and also if light emitting diodes are built-in as light source in the light panel.

In a preferred embodiment, in order to take maximum advantage of the self-supporting and torsion-rigid light panel front, the surrounding frame is produced from cellular plastic. It is in most applications preferred to use a rigid cell plastic. The choice between an expanded or an extruded cellular plastic depends on the application of the light panel. Extruded polystyrene plastic may in most applications be the preferred choice due to a combination of low weight and high strength. To various extent the advantages of the present invention may however be achieved also in embodiments wherein the light panel frame is manufactured from other material, such as from other synthetic material, or from wood or cork or other natural material, or light metal, or combinations thereof. Naturally, it would also be conceivable to use also in the light panel frame a translucent material of similar kind as that which is used in the light panel front.

The light panel frame may be of any suitable cross-sectional shape. Beside rectilinear, rectangular cross-sectional profiles, the frame may also have curved or shaped sides. In preferred embodiments, where the frame is produced from extruded polystyrene or other rigid plastic, the frame may advantageously include measures to withstand exposure to UV-light, such as through a UV-protective color or film or a thin plastic or metal foil, e.g., that is arranged on the exposed outer side of the frame, at least.

The light panel front and the light panel frame may be connected in various ways.

For instance, the light panel front may be arranged to cover the forward edge of the frame in order this way to distribute light to the very edge of the light panel front. Alternatively, the inner sides of the light panel frame may be formed with a notch into which the light panel front is insertable upon mounting. In another alternative embodiment it is foreseen that the frame is arranged recessed into the marginal regions of the light panel front whereby the forward edge of the light panel frame may be glued to the inner face of the forward panel of the light panel front. Other forms of connection between the light panel front and the light panel frame are possible, and the invention is not limited to the aforementioned examples.

A light panel according to the present invention may be used as a substrate for a symbol that is supported and exposed on the light panel front. In such applications, the light panel may have a simple and geometric basic shape that differs from the outline of the symbol in a front plane view.

The light panel may alternatively be shaped as a symbol, whereby the outline of the light panel is the same as the outline of the symbol in a front plane view. Naturally, the light panel may also in this embodiment be formed to have an arbitrary geometric basic shape, especially if the symbol in question is merely a distinguishing color.

In all cases, the light panel frame may be cut from a single piece of material to accommodate to the shape of a symbol. A manufacturing process that is preferred from a manufacturing point of view results in a frame that is cut out from a cellular plastic block.

The manufacturing process comprises a first step wherein an inner periphery of the light panel frame is formed by means of a numerically controlled milling cutter or cutting machine from a block of cellular plastic, when in a second step the light panel front is glued onto the face of the cellular plastic block. Then, the outer periphery of the frame and the light panel front are shaped simultaneously. Symbols of complicated shape can this way be produced through a manufacturing process that permits simple shifting between different symbols which are digitized and saved in digital form. In other words, a light panel according to the present invention can be produced in a rational and automized process, while avoiding conventional production steps like plate bending, welding and screw fitting.

From the above it will be seen that the light panel front may serve as a carrier for a symbol independently of whether the symbol is a separate element attached to the light panel front, or a shape and/or a color that is applied to the light panel front during manufacture of the light panel.

In embodiments where the light source comprises light diodes that are built-in into the light panel, the light diodes may be mounted directly to the inner side of the light panel frame or may alternatively be mounted in a socket means of non-specified structure that is attached to the frame. In the case of a light source that is mounted on the inner side of the frame, this light source may be arranged to cooperate with a light reflecting element, such as a mirror-glass foil, if appropriate, by which light is reflected towards the light panel front.

The light source may alternatively be supported on a light panel back connected to the rear periphery of the light panel frame.

A light panel back, if appropriate, may be formed of any arbitrary material. The light panel back may be formed to have the same shape as the light panel itself in a front plane view. The light panel back may also be formed from a translucent panel of similar type as is comprised in the light panel front, forming a light panel having two each other opposing translucent faces.

Similar to the light panel frame, the light panel back may alternatively be manufactured from rigid cellular plastic preferably of the same quality as is used in the frame. The frame and the light panel back may also alternatively be formed from one singular piece of material, such as by milling performed on a cellular plastic block. The light panel back may alternatively be molded, having molded-in sockets for one or more light sources and/or having molded-in mounting means serving for mounting the light panel.

A light panel arranged as described offers great flexibility in design and exposure of a symbol. Obviously, in conventional ways, translucent or light-proof films, printed half-tone pictures or photos in single- or multicolor, etc., may be applied directly to the front face of the light panel front. When a clear and transparent material is used in the light panel front, various effects can be achieved by placing a symbol on the forward panel or on the rear panel of the light panel front. Other effects may be accomplished if the symbol is positioned in the middle of an over-dimensioned opening through a light scattering or light-proof mask which is applied to a translucent light panel front. Also, the brightness of a trans-illuminated symbol can be varied if the whole symbol or only a portion of the symbol is positioned in front of an opening through a light reducing mask, etc.

In result of its simplified manufacture and use of the suggested and relatively low-prized materials, a light panel according to the present invention can be produced in small numbers and in small dimensions, in a cost-effective process. Due to a low weight, the light panel is also particularly suitable for production of light panels having large dimensions.

The low total weight leads to simplified handling. In addition, the low weight raises significantly reduced demands for anchorage of the light panel to a supporting structure. A light panel according to the present invention is for this reason particularly suited for mounting onto fragile surfaces such as glass walls or walls having easily destroyed coatings, as well as walls in which boring is undesired, or in roofs, and even onto soft surfaces such as textile or synthetic material surfaces. Another advantage provided by the low weight is the reduced risk of injury caused by a light panel that is dropped and falling down.

In order to benefit to a maximum from the low weight of material and structure as provided in the present invention, electrical supply of the light source, including transformer and connections to the supply mains, may be separated from the light panel and arranged externally thereof. When light diodes are used as light source, the light panel requires practically no maintenance and the service interval is determined by the life length of the light diodes.

Notwithstanding the fact that the prime object for the light panel is its function as a carrier of information or of a message, it will be understood that the light panel may also function as a light source. It is particularly foreseen that the light panel can be used as an illuminating panel dimensioned for coverage of a part or the whole area of a wall or a roof.

SHORT DESCRIPTION OF THE DRAWINGS

Embodiments of the invention will be explained below with reference made to the appended, schematic drawings. In the drawings:

FIG. 1 is a cross-sectional view through a first embodiment of a light panel according to the invention;

FIGS. 2a-2e show alternative embodiments of a light panel front included in the light panel.

DETAILED DESCRIPTION OF EMBODIMENTS

Figure 3A:
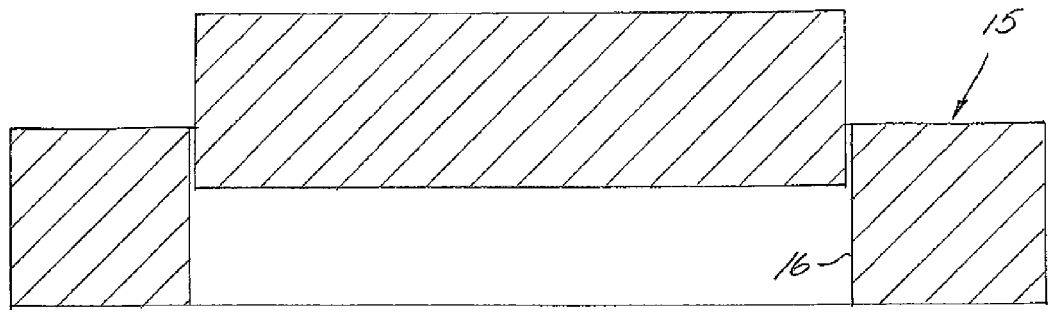
FIGS. 3a-3c show different stages in the manufacture of a light panel according to the invention.

FIG. 1 is a schematic cross-sectional view through a light panel according to the invention. In FIG. 1, reference number 1 indicates a frame which runs about the light panel and which is connected, in a forward edge thereof, to a translucent light panel front 2. In the embodiment illustrated in FIG. 1 the light panel frame 1 is manufactured from cellular plastic, and preferably from extruded polystyrene cell plastic. Light sources 3 are arranged inside of the frame and controllable for emitting light to be transmitted through the light panel front 2. The light source 3 may be realized in the form of light emitting diodes which are shown mounted on a light panel back 4, connected to a rear periphery of the frame.

In the embodiment of FIG. 1, the light emitting diodes 3 are distributed over the area of the light panel for an even transmission of light through the light panel front 2. Preferably, a light emitting diode 3 designed for a wide angular spread of emitted light is used in this case.

Electrical wiring, transformers and controls are omitted from the drawings as these are well known by persons skilled in the art and the incorporation thereof is of little of no significance for the description and understanding of the present invention. It should however be mentioned that power supply is preferably separately arranged outside the light panel.

In the embodiment of FIG. 1, a region at the edge of the light panel front 2 is recessed into a notch 5 that runs about an inner periphery of the light panel frame. Outwardly, the notch 5 is delimited through an outer region 6 which, in turn, can be recessed into the edge region of the light panel front 2. In the illustrated embodiment, a covering film or foil 7 is applied to the outside surface of the frame for protection against ultraviolet wavelengths in the sunlight.

The light panel front 2 comprises a translucent and self-supporting structure 8. A symbol 9, in an elementary version comprising a colored or uncolored and translucent plastic film, can be applied to the outer face of the self-supporting structure 8. The front panel 2 comprises a forward panel 10 which is distanced from a rear panel 12 by means of cross-linking walls 11, this way forming a self-supporting structure with inherent torsional rigidity. In the embodiment of FIG. 1, the cross-linking walls 11 form uniform channels which run in parallel with the orientation of the light panel front.

In a preferred embodiment the light panel front 2 is formed from a sheet of clear polycarbonate plastic, available in the market under the name of channel plastic.

In order to ensure an evenly illuminated light panel, wherein light of uniform brightness is emitted from the entire front face of the light panel, the present invention prescribes a light scattering medium to be positioned between the light source/light sources 3 and the forward panel 10 of the light panel front. As used herein, the term light scattering medium relates to a medium which causes refraction of incident light and emits light at different random angles. The light scattering medium can be in form of an applied material or in the form of a performed measure which emits diffuse light that is composed of an indefinite number of random light beam directions to the forward panel 10, whereby the forward panel 10 receives a diffuse light from the at least one light source 3, lying behind the light scattering medium.

In the illustrated embodiment, a light scattering film or foil 13 is applied to the rear panel 12 of the light panel front. The light scattering film 13 effects refraction of incident light from the light source 3 and emits a diffuse light to the light panel front.

Other types of light scattering material or measures are available for application to the rear panel in order to emit a diffuse light to the forward panel of the light panel front. To be mentioned in this connection are, e.g., surface treatment such as painting, roughening or etching, incorporation of light scattering or light reducing substances in the plastic, or application of soft light scattering films or foils or rigid sheet material onto the rear panel.

A light scattering medium may alternatively be realized in the form of matting/frosting applied to the rear panel 12 to accomplish a diffuse light to be emitted to the forward panel 10.

Another alternative includes a light scattering medium in the form of a sheet element that is applied between the light source 3 and the light panel front 2, and which emits a diffuse light to the light panel front.

The light scattering medium may alternatively be realized in the form of a translucent material arranged within the light panel front 2, between the forward panel 10 and the rear panel 12. A translucent material may alternatively be arranged to occupy the cavities formed in the self-supporting structure, in which case a material is preferably chosen which has the same refractive index as the material which forms the self-supporting structure.

A translucent cell material which emits diffuse light to the forward panel 10 may be arranged to fill the cavities of the self-supporting structure, or may alternatively be arranged to provide, by its cell-defining walls, also the transverse cross-linking walls that distance the forward panel from the rear panel in the light panel front.

Alternative embodiments of the light panel front 2 are illustrated in FIGS. 2a-2e. The cross-sectional view of FIG. 2a illustrates a multi-layered embodiment wherein an additional panel 14 is positioned between the forward panel 10 and the rear panel 12, running in parallel with the two. Cross-linking walls 11 distance the intermediate panel 14 from the forward and rear panels, respectively, of the light panel front 2.

The cross-sectional view of FIG. 2b illustrates an embodiment wherein cross-linking walls 11 run at crossing angles to each other in a framework structure between the forward and rear panels.

The cross-sectional view of FIG. 2c illustrates an embodiment wherein cross-linking walls 11 define cylindrical channels running in parallel with the light panel front.

The cross-sectional view of FIG. 2d illustrates an embodiment comprising irregularly shaped and randomly distributed cross-linking walls 11 in a randomized structure having randomly shaped cavities between the forward panel 10 and the rear panel 12. FIG. 2d also serves to illustrate an embodiment wherein a translucent sheet of cellular plastic is inserted between the forward panel 10 and the rear panel 12, wherein the cells of the cellular plastic form cavities that are defined between cell walls that in turn form the cross-linking walls 11, randomly distributed between the forward and rear panels of the light panel front.

FIG. 2e is a front view which illustrates an embodiment wherein cross-linking walls 11 define channels running transversely to the main direction of the light front panel. This embodiment includes transverse channels of arbitrary cross-sectional shape, such as polygonal channels, rounded, oval or circular channels, star-shaped channels and channels of honeycomb cross-sectional shapes, etc.

The embodiments presented above illustrate that the present invention can be realized in light panels of extremely low weight and with minimized mounting depths. Also if electrical wires required for connection to external power supply be added to the different embodiments, which are only schematically illustrated in the drawings, it will be realized that significant reduction of weight is achievable as compared to a conventionally structured lighting box of corresponding size, made of metal plate with a front panel that is made of homogenous acrylic plastic.

Figure 3B:
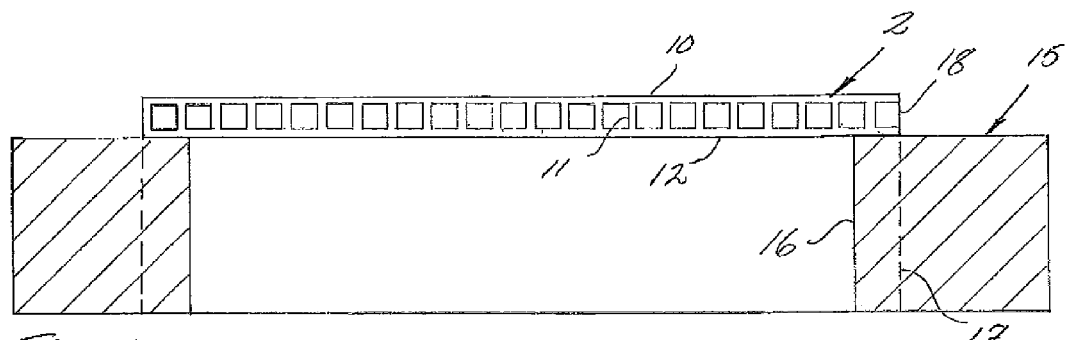
Figure 3C:
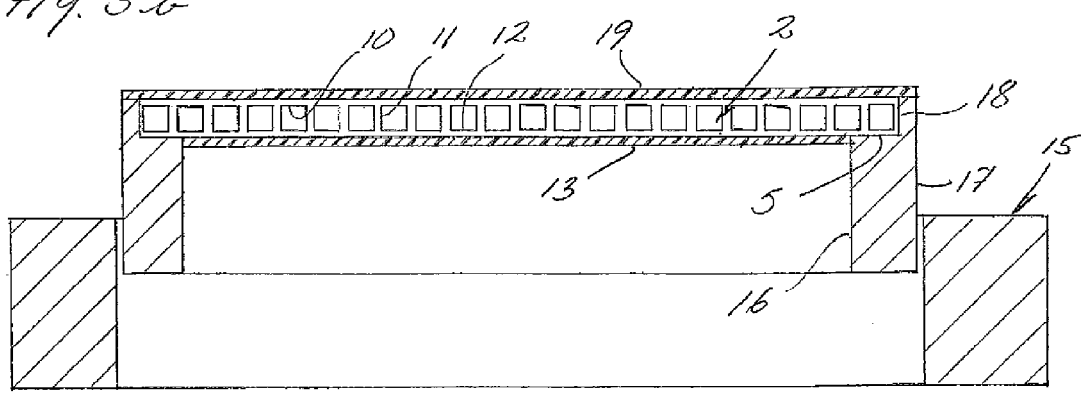

With reference made to FIGS. 3a-3c, a manufacturing process comprising the following steps is provided for the manufacture of a light panel according to the present invention:

cutting a hole through a cellular plastic block 15, wherein the hole is shaped to the inner periphery 16 of a light panel frame;

gluing a translucent light panel front 2 to cover the hole such that an edge 18 of the light panel front reaches radially outside the inner periphery 16 of the frame around the hole, and cutting the outer periphery 17 of the frame (see dashed line in FIG. 3b) alongside or outwardly of the edge 18 of the light panel front.

The manufacturing process may further comprise the step of forming a notch 5 in the inner periphery of the frame, to a notch depth which corresponds substantially to the thickness of the light panel front 2 and to a notch width that permits insertion of the light panel front 2 in the notch 5. The light panel front is then glued to the bottom and to the wall of the notch, preferably while ensuring that the forward face of the light panel front is positioned flush with the surface of the cellular plastic block outside the light panel font, followed by cutting the outer periphery 17 of the frame at a radial distance outside the edge 18 of the light panel front.

Advantageously, cutting the outer periphery of the frame may be preceded by gluing a translucent foil or film 19 onto the forward face of the forward panel 10 of the light panel front, and onto the cellular plastic block 15 outside the edge of the light panel front. A self-adhering plastic film or foil may advantageously be used for this purpose, or a liquid adhesive or a two-sided adhesive tape that is applied between the light panel front and the external plastic film 19.

Cutting the outer periphery of the frame may also include simultaneous cutting of the outline of the external film 19 and the layer of adhesive that binds the film 19 to the forward edge of the frame, in order this way to provide a surrounding and continuous seal between the frame and the light panel front. Shaping of the outer periphery of the frame may in addition involve cutting or milling performed in several steps of which the last step results in the final outer shape of the frame.

The manufacturing process may in addition involve the step of forming, preferably from a sheet of channel plastic made of polycarbonate plastic, a light panel front to have the outline of a letter, a logotype or other symbol, before the light panel front is glued to the cellular plastic block. A light scattering material 13 is preferably applied to the rear panel 12 before the light panel front is glued to the cellular plastic block.

This manufacturing process makes possible a rational and simultaneous production of sets of light panels having more or less complex shapes, such as letters and logotypes, from a block of cellular plastic. Using a numerically controlled cutter or milling machine, all inner peripheries can be formed in a first production step followed by mounting of light panel fronts according to any of the above recited procedures. Before cutting out the frames and light panel fronts from the cellular plastic block, the externally applied film may be arranged to cover the whole cellular plastic block and all the simultaneously produced light panels, followed by cutting through the external film, the adhesive layer and the block along the outer peripheries of the light panel frames. The operator can this way distribute and orient the light panels for best possible exploitation of the cellular plastic block already at programming of the cutting machine.

By applying the manufacturing steps described above, a light panel frame can be produced from a light-weight cellular plastic material such as expanded or extruded polystyrene cell plastic. Since the light panel front has inherent self-supporting properties and low weight there is no heavy demand for special mechanical properties in the frame, since the frame, also if designed with a relatively thin wall, is stabilized by the self-supporting light panel front before being released from the cellular plastic block. The outer side of the light panel frame made of cellular plastic is preferably subjected to treatment with UV-protection material.

With respect to alternative materials, designs and combination of light panel features illustrated in the drawings, reference is made to preceding paragraphs wherein these are sufficiently explained to avoid repeating in this chapter of the description.

The invention claimed is:

1. A light panel comprising a light panel front (2) made of a translucent, self-supporting structure having a forward panel (10) distanced from a rear panel (12) by means of cross-linking walls (11) and arranged in the light panel to transmit light from one or more light sources (3) arranged behind the light panel front, wherein a light scattering medium is arranged between the light source (3) and the forward panel (10) of the light panel front, and wherein the cross-linking walls (11) are transparent or translucent.

2. The light panel of claim 1, wherein the light scattering medium is a material or a treatment applied to the rear panel (12) that emits a diffuse light to the light panel front (2).

3. The light panel of claim 1, wherein the light scattering medium is a frosting applied to the rear panel (12) that emits diffuse light to the forward panel (10).

4. The light panel of claim 1, wherein the light scattering medium is a sheet material arranged between the light source (3) and the light panel front (2) that emits diffuse light to the light panel front (2).

5. The light panel of claim 1, wherein the light scattering medium is a translucent cellular material inserted within the light panel front (2), between the forward panel (10) and the rear panel (12).

6. The light panel of claim 1, wherein the light panel front (2) is supported by a frame (1) formed in one piece, a forward edge of which connects to the light panel front (2).

7. The light panel of claim 6, wherein an edge region of the light panel front (2) is recessed into a notch (5) that runs about an inner periphery of the frame (1).

8. The light panel of claim 6, wherein the frame (1) is cut from a piece of cellular plastic to the shape of the outline of the light panel front.

9. The light panel of claim 7, wherein the frame (1) is cut from a piece of cellular plastic to the shape of the outline of the light panel front.

10. A process for the manufacture of a light panel having a translucent light panel front, comprising the following manufacturing steps:
    cutting a hole through a cellular plastic block (15), the hole forming an inner periphery (16) of a light panel frame;
    gluing a translucent light panel front (2) to cover the hole such that an edge (18) of the light panel front reaches radially outside the inner periphery (16) of the frame around the hole, and
    cutting an outer periphery (17) of the frame alongside or outwardly of the edge of the light panel front,
    wherein a light scattering material (13) is applied to the rear panel (12) of the light panel front before the light panel front is glued to the cellular plastic block.

11. The process of claim 10, further including the steps of:
    forming a notch (5) in the inner periphery of the frame to a depth that substantially corresponds with the thickness of the light panel front and to a width that permits insertion of the light panel front (2) into the notch (5);
    gluing the light panel front to a bottom and wall of the notch, and
    cutting the outer periphery (17) of the frame at a distance outside the edge (18) of the light panel front.

12. The process of claim 11, wherein the step of cutting the outer periphery of the frame is preceded by the step of:
    gluing a translucent plastic film (19) onto the forward panel (10) of the light panel front, as well as to the cellular plastic block (15) outside the edge (18) of the light panel front.

13. The process of claim 10, wherein the light panel front is formed to the shape of a letter, a logotype or any other symbol before gluing to the cellular plastic block.

14. The process of claim 10, wherein the outside of the frame is treated with UV-protection material (7).

15. The process of claim 10, wherein the light panel front is formed from a sheet of channel plastic produced from clear polycarbonate plastic.

16. The process of claim 10, wherein the frame is formed from extruded polystyrene plastic.

17. The process of claim 11, wherein the light panel front is formed to the shape of a letter, a logotype or any other symbol before gluing to the cellular plastic block.

18. The process of claim 12, wherein the light panel front is formed to the shape of a letter, a logotype or any other symbol before gluing to the cellular plastic block.

19. A light panel comprising a light panel front (2) made of a translucent, self-supporting structure having a forward panel (10) distanced from a rear panel (12) by means of cross-linking walls (11) and arranged in the light panel to transmit light from one or more light sources (3) arranged behind the light panel front, characterized in that a light scattering medium is arranged between the light source (3) and the forward panel (10) of the light panel front, wherein the light scattering medium is a material or a treatment applied to the rear panel (12) that emits a diffuse light to the light panel front (2).

* * * * *